United States Patent
Le et al.

(10) Patent No.: US 11,060,397 B2
(45) Date of Patent: Jul. 13, 2021

(54) DISPOSING A CARRIER DOWNHOLE IN A WELLBORE TO EVALUATE AN EARTH FORMATION

(71) Applicants: Fei Le, Houston, TX (US); Julio Roberto Arro, Cipolletti (AR); Stephen N. Dymmock, Spring, TX (US); Stanislav Forgang, Houston, TX (US); Hermanus J. Nieuwoudt, Tomball, TX (US)

(72) Inventors: Fei Le, Houston, TX (US); Julio Roberto Arro, Cipolletti (AR); Stephen N. Dymmock, Spring, TX (US); Stanislav Forgang, Houston, TX (US); Hermanus J. Nieuwoudt, Tomball, TX (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 126 days.

(21) Appl. No.: 16/430,490

(22) Filed: Jun. 4, 2019

(65) Prior Publication Data
US 2019/0383131 A1 Dec. 19, 2019

Related U.S. Application Data

(60) Provisional application No. 62/686,974, filed on Jun. 19, 2018.

(51) Int. Cl.
*E21B 47/01* (2012.01)
*G01N 27/22* (2006.01)
(Continued)

(52) U.S. Cl.
CPC ......... *E21B 47/101* (2013.01); *G01N 27/221* (2013.01); *G01N 27/226* (2013.01);
(Continued)

(58) Field of Classification Search
CPC .... E21B 47/01; E21B 47/001; E21B 47/0228; E21B 47/12; G01N 27/221; G01N 27/226
(Continued)

(56) References Cited

U.S. PATENT DOCUMENTS

| 2,313,842 A | * | 3/1943 | Rigterink | ................ C04B 35/16 501/141 |
| 2,332,343 A | * | 10/1943 | Rigterink | ............... H01B 3/085 501/32 |

(Continued)

OTHER PUBLICATIONS

Cametti et al.; "Complex Electrical Conductivity of Water-in-Oil Microemulsions"; The American Physical Society; Physical Review Letters; vol. 75, No. 3; Jul. 17, 1995; pp. 569-572.
(Continued)

*Primary Examiner* — Christopher P McAndrew
(74) *Attorney, Agent, or Firm* — Cantor Colburn LLP

(57) ABSTRACT

An example method includes disposing a carrier in a borehole in an earth formation. The carrier includes a logging assembly for performing a formation evaluation of the earth formation using a sensor in proximity to a borehole wall of the borehole, fluid being disposed at least partially between the sensor and the borehole wall. The method further includes estimating an apparent dielectric loss angle of the fluid to determine a stand-off effect caused by the fluid. The method further includes estimating a formation dielectric loss angle and determining a formation resistance based at least in part on the formation dielectric loss angle. The method further includes adjusting the formation evaluation based at least in part on the estimated formation resistance that accounts for the stand-off effect caused by the fluid. The method further includes performing a wellbore operation based at least in part on the adjusted formation evaluation.

12 Claims, 12 Drawing Sheets

(51) Int. Cl.
*E21B 47/12* (2012.01)
*E21B 47/001* (2012.01)
*E21B 47/0228* (2012.01)
*E21B 47/10* (2012.01)

(52) U.S. Cl.
CPC ......... *E21B 47/001* (2020.05); *E21B 47/0228* (2020.05); *E21B 47/12* (2013.01)

(58) Field of Classification Search
USPC .......................................................... 324/663
See application file for complete search history.

(56) References Cited

U.S. PATENT DOCUMENTS

| | | | | |
|---|---|---|---|---|
| 3,315,260 | A * | 4/1967 | Wesch | B32B 27/00 342/3 |
| 4,216,449 | A * | 8/1980 | Kach | H01P 3/16 333/236 |
| 4,740,265 | A * | 4/1988 | Bierlein | C30B 33/00 385/131 |
| 8,633,701 | B2 | 1/2014 | Itskovich et al. | |
| 9,513,399 | B2 | 12/2016 | Cheung et al. | |
| 9,671,517 | B2 * | 6/2017 | Hayman | G01V 3/24 |
| 2007/0046290 | A1 | 3/2007 | Bespalov et al. | |
| 2011/0199089 | A1 * | 8/2011 | Hayman | G01V 3/24 324/347 |
| 2011/0199090 | A1 * | 8/2011 | Hayman | E21B 47/085 324/356 |
| 2011/0241689 | A1 * | 10/2011 | Hayman | G01V 3/24 324/355 |
| 2011/0241690 | A1 * | 10/2011 | Hayman | G01V 3/24 324/355 |
| 2011/0309833 | A1 * | 12/2011 | Yang | G01V 3/28 324/338 |
| 2012/0074946 | A1 * | 3/2012 | Forgang | G01V 3/24 324/355 |
| 2013/0307546 | A1 * | 11/2013 | Li | G06F 1/3203 324/333 |
| 2014/0184229 | A1 * | 7/2014 | Bloemenkamp | G01V 3/20 324/369 |
| 2014/0353719 | A1 | 12/2014 | Kim | |
| 2015/0008927 | A1 * | 1/2015 | Cheung | G01V 3/20 324/339 |
| 2015/0355372 | A1 * | 12/2015 | Bloemenkamp | G01V 13/00 702/7 |
| 2017/0227666 | A1 | 8/2017 | Legendre et al. | |

OTHER PUBLICATIONS

International Search Report and Written Opinion Issued in International Application No. PCT/US2019/037054 dated Oct. 2, 2019; 10 Pages.

Jannin et al.; "Dielectric Properties of Nonaqueous Drilling Fluids from 1 MHz up to 20 GHz"; IEEE Transactions on Dielectrics and Electrical Insulation; vol. 21, No. 1; Feb. 2014; pp. 217-224.

Patil et al.; "Experimental Study of Electrical Properties of Oil-Based Mud in the Frequency Range from 1 to 100 MHz"; SPE Drilling & Completion; Sep. 2010; pp. 380-390.

* cited by examiner

DISPOSING A CARRIER DOWNHOLE IN A WELLBORE TO EVALUATE AN EARTH FORMATION

CROSS-REFERENCE TO RELATED APPLICATION

This application claims the benefit of U.S. Provisional Application Ser. No. 62/686,974 filed Jun. 19, 2018, the entire disclosure of which is incorporated herein by reference.

BACKGROUND

The present disclosure relates generally to wellbore operations and more particularly to disposing a carrier downhole in a wellbore to evaluate an earth formation.

Hydrocarbon exploration and energy industries employ various systems and operations to accomplish activities including drilling, formation evaluation, stimulation, and production. Various measurement techniques may be employed to facilitate hydrocarbon exploration and production activities. A carrier can be disposed downhole in a wellbore to evaluate an earth formation. The formation evaluation can be useful for extracting hydrocarbons from the formation.

BRIEF SUMMARY

Embodiments of the invention described herein provide systems, methods, and computer program products for disposing a carrier downhole in a wellbore to evaluate an earth formation. In one embodiment, a method includes disposing a carrier in a borehole in an earth formation, the carrier comprising a logging assembly for performing a formation evaluation of the earth formation using a sensor in proximity to a borehole wall of the borehole, fluid being disposed at least partially between the sensor and the borehole wall. The method further includes estimating, by a processing device, an apparent dielectric loss angle of the fluid to determine a stand-off effect caused by the fluid using at least one of a logging with a closed pad technique, a logging in a cased-hole section technique, and a log-based estimation technique. The method further includes estimating, by the processing device, a formation dielectric loss angle. The method further includes determining, by the processing device, a formation resistance based at least in part on the formation dielectric loss angle. The method further includes adjusting the formation evaluation based at least in part on the estimated formation resistance that accounts for the stand-off effect caused by the fluid. The method further includes performing a wellbore operation based at least in part on the adjusted formation evaluation that accounts for the stand-off effect caused by the fluid.

In another embodiment, a system includes a carrier disposed in a borehole in an earth formation, the carrier comprising a logging assembly for performing a formation evaluation of the earth formation using a sensor in proximity to a borehole wall of the borehole, fluid being disposed at least partially between the sensor and the borehole wall. The system further includes a memory comprising computer readable instructions and a processing device for executing the computer readable instructions for performing a method, which includes estimating, by the processing device, an apparent dielectric loss angle of the fluid to determine a stand-off effect caused by the fluid using at least one of a logging with a closed pad technique, a logging in a cased-hole section technique, and a log-based estimation technique. The method further includes estimating, by the processing device, a formation dielectric loss angle. The method further includes determining, by the processing device, a formation resistance based at least in part on the formation dielectric loss angle. The method further includes adjusting the formation evaluation based at least in part on the estimated formation resistance that accounts for the stand-off effect caused by the fluid. The method further includes performing a wellbore operation based at least in part on the adjusted formation evaluation that accounts for the stand-off effect caused by the fluid.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

A detailed description of one or more embodiments of the disclosed system, apparatus, and method presented herein by way of exemplification and not limitation with reference to the figures. Disclosed are techniques for correction of mud stand-off effect on oil-based mud resistivity images for formation evaluation.

Figure 1A:
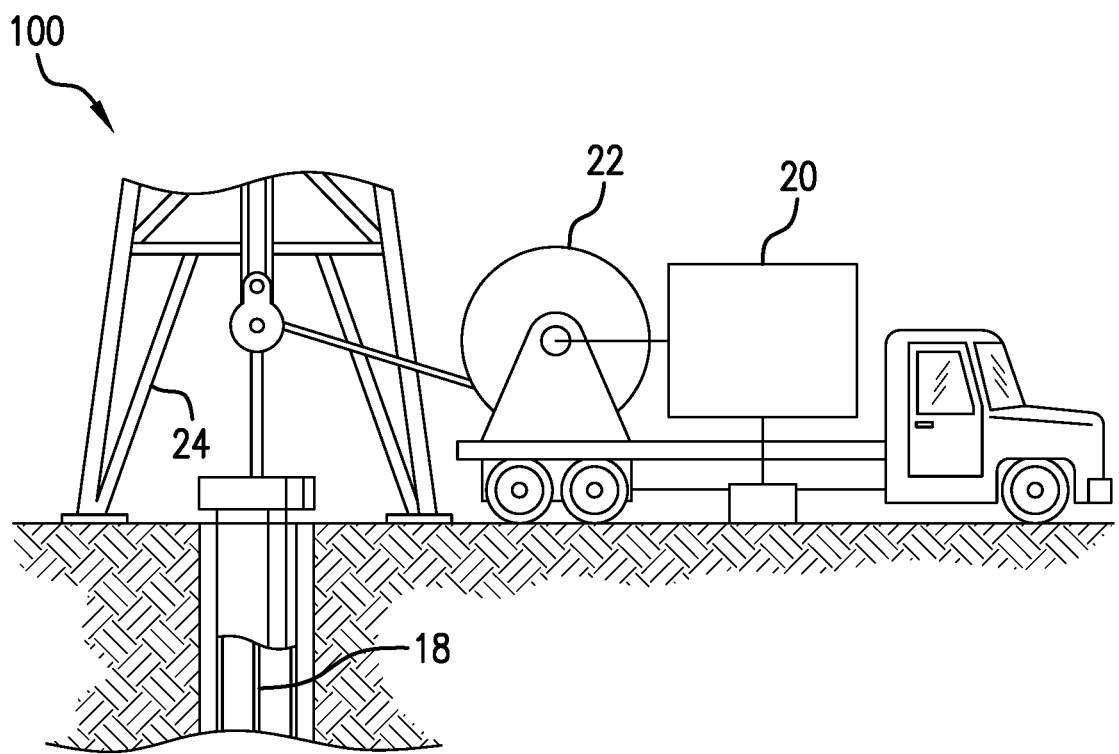
FIG. 1A depicts an embodiment of a system for evaluating or measuring a formation according to one or more embodiments described herein.
Figure 1A:
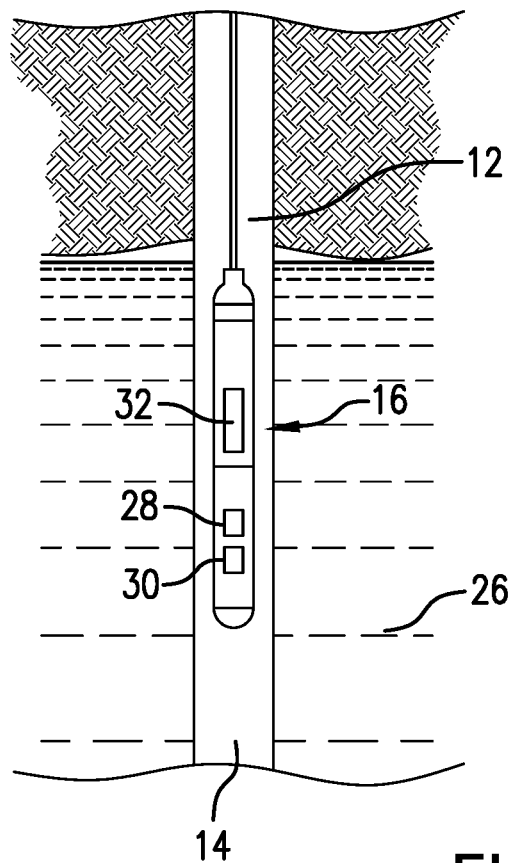

Apparatus for implementing the disclosure and features related to the disclosure is now discussed. FIG. 1A illustrates aspects of an exemplary embodiment of a system 100 for performing energy industry operations such as formation measurement and/or evaluation, hydrocarbon production, completion, and stimulation. The system 100 includes a borehole string 12 such as a pipe string, coiled tubing, wireline or other carrier disposed within a borehole 14 that is suitable for lowering a tool or other component through a borehole or connecting a component to the surface. The term "carrier" as used herein means any device, device component, combination of devices, media and/or member that may be used to convey, house, support or otherwise facilitate the use of another device, device component, combination of devices, media and/or member. Exemplary non-limiting carriers include casing pipes, wirelines, wireline sensors, slickline sensors, drop shots, downhole subs, BHA's, fracturing (fracing) ports, and drill strings.

In the embodiment shown in FIG. 1A, the system 100 is configured as a well logging system that includes a logging assembly or tool 16 that is disposed in the borehole 14 via a wireline 18. A surface deployment system includes a processing system 20 for controlling a winch 22 or another deployment device that lowers the wireline 18 from a rig 24, platform, wellhead and/or other surface structure. The system 100 may include other components for facilitating a measurement operation, and/or for facilitating other energy operations. For example, the system 100 may include a pumping device in fluid communication with a fluid tank or other fluid source for circulating fluid through the borehole 14. The system 100 may also include a drilling assembly. Measurement operations can thus be performed in conjunction with energy industry operations, such as drilling operations, stimulation operations (e.g., hydraulic fracturing and steam lift), completion operations, and production operations.

It may be desirable to perform formation resistivity imaging to identify bedding, fractures, faults, stratigraphic features, and borehole features, such as breakout and drilling-induced fractures. To accomplish the formation resistivity imaging, sensors in the tool 16 are used to collect data about a formation 26. The sensors include pads that are in contact (also referred to as "sensor-to-formation" contact) with a wall of the borehole 14. However, drilling fluid ("mud") can come between the sensor pads and the formation, which affect resistivity measurement accuracy. This phenomenon is referred to as the "mud stand-off effect" and can cause resistivity measurements to be inaccurate.

According to the example of FIG. 1A, the tool 16 may be configured as a data acquisition tool that is a part of a measurement and/or monitoring system. The data acquisition tool 16 is disposed in the borehole 14 and advanced (e.g., run in hole, run out of hole) to an area or location of interest within the formation 26. The data acquisition tool 16 is configured to emit measurement signals into the formation 26 to estimate characteristics thereof. The borehole 14 may be a vertical borehole as shown in FIG. 1A, but is not so limited. The borehole or portions thereof can be vertical, deviated, horizontal, etc. and can have any selected path through a formation.

In one embodiment, the tool 16 and/or the system 100 is configured for oil-based mud resistivity imaging of the formation 26 and/or another area of interest. The tool 16 includes one or more sensors that collect data, such as resistivity data, about the formation 26. Examples of such sensors can include density detectors and microresistivity electrode sensors. In an example, a sensor includes a transmission unit 28 and a reception unit 30. The sensor, having the transmission unit 28 and reception unit 30, can be disposed in a "pad" of the tool 16 such that the pad (and accordingly the sensor) is pressed firmly against the borehole wall in sensor-to-formation contact. The transmission unit 28 transmits signals into the formation 26, and the reception unit 30 receives return signals from the formation 26. Based on these return signals, the tool 16 generates an image (e.g., a resistivity image) of the wall of the borehole filled with oil-based mud (drilling fluid) and/or the formation 26. For example, features of the formation 26 can be evaluated by imaging formation fractures. Sensors are in sensor-to-formation contact with the borehole wall to improve the accuracy of data collected by the sensors. However, in cases where the oil-based mud come between the sensor/pad and the borehole wall (i.e., when "mud stand-off" occurs), the accuracy of data collected by the sensors, and thus the corresponding formation resistivity imaging, is reduced.

Images generated using the tool 16 can be analyzed to evaluate formation characteristics, such as identifying and characterizing natural and/or stimulated fractures (e.g., estimating strike, dip, and apparent aperture). This information is useful in evaluating formations, performing fracturing operations, and monitoring or evaluating other subterranean operations such as geothermal energy production. To improve the accuracy of formation evaluation performed by resistivity imaging, it is beneficial to correct for effects of oil-based mud standoff.

The data acquisition tool 16 is configured to monitor and/or collect data related to formation characteristics. The tool 16 may be deployed downhole via any suitable carrier and may be configured to operate in conjunction with other downhole or surface tools. In one embodiment, the tool 16 and/or other downhole components are in communication with one or more processing units or devices, such as a downhole electronics unit 32 and/or a surface processor such as the processing system 20. The processing devices are configured to perform functions including receiving, storing, transmitting and/or processing data from the tool 16, and providing control functionality to the system 100 to control the components thereof. The processing devices include any number of suitable components, such as processors, memory, communication devices and power sources. Communication can be achieved via any suitable configuration, such as acoustic, electrical or optical communication, wireless communication, and mud pulse telemetry.

Figure 1B:
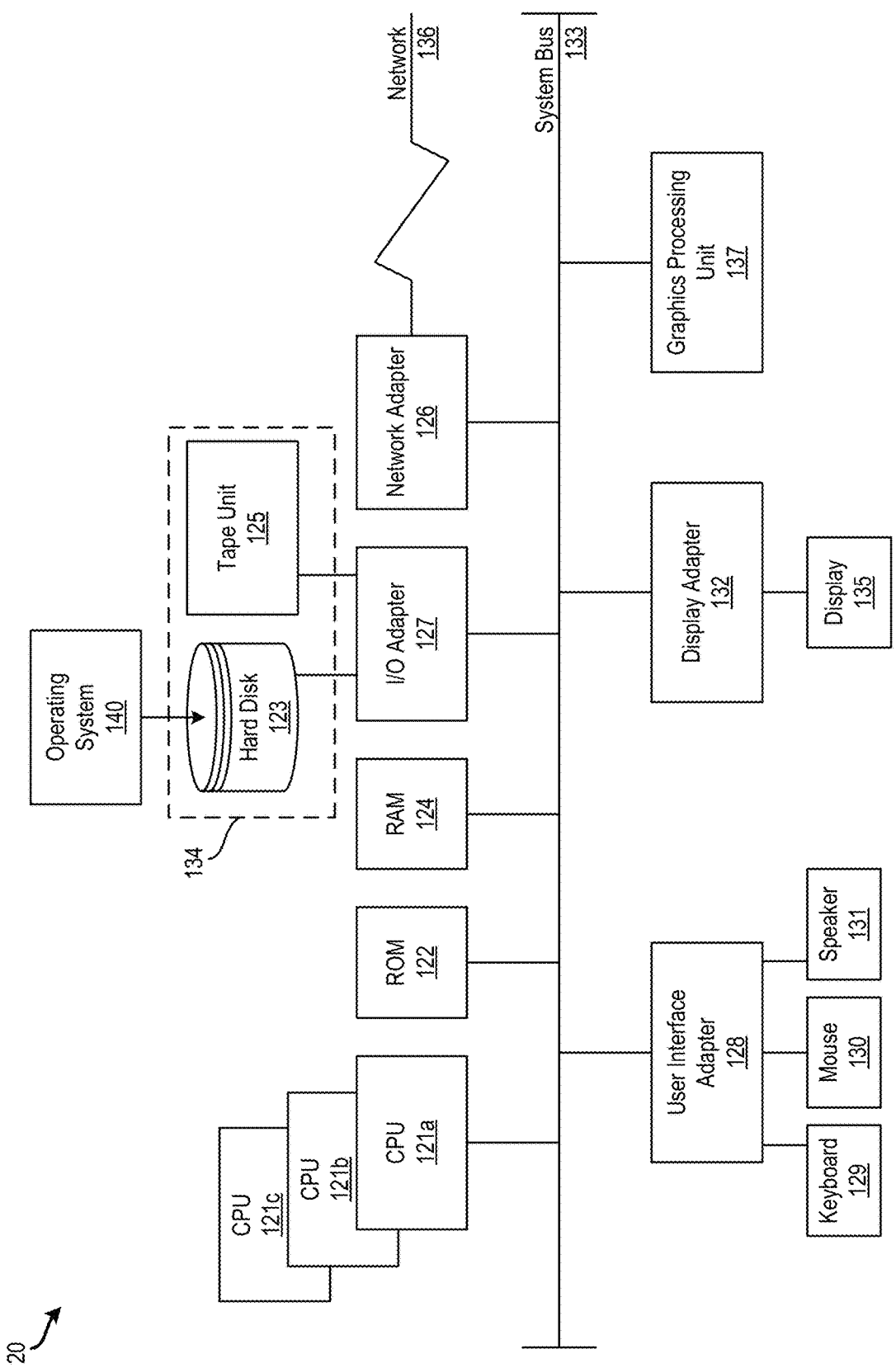
FIG. 1B depicts a block diagram of the processing system of FIG. 1A, which can be used for implementing the techniques described herein.

It is understood that embodiments of the present invention are capable of being implemented in conjunction with any other suitable type of computing environment now known or later developed. For example, FIG. 1B depicts a block diagram of the processing system 20 of FIG. 1A, which can be used for implementing the techniques described herein. In examples, processing system 20 has one or more central processing units (processors) 121a, 121b, 121c, etc. (collectively or generically referred to as processor(s) 121 and/or as processing device(s)). In aspects of the present disclosure, each processor 121 can include a reduced instruction set computer (RISC) microprocessor. Processors 121 are coupled to system memory (e.g., random access memory (RAM) 124) and other components via a system bus 133. Read only memory (ROM) 122 is coupled to system bus 133 and may include a basic input/output system (BIOS), which controls certain basic functions of processing system 20.

Further depicted are an input/output (I/O) adapter 127 and a network adapter 126 coupled to system bus 133. I/O adapter 127 may be a small computer system interface (SCSI) adapter that communicates with a hard disk 123 and/or a tape storage drive 125 or any other similar component. I/O adapter 127, hard disk 123, and tape storage device 125 are collectively referred to herein as mass storage 134. Operating system 140 for execution on processing system 20 may be stored in mass storage 134. The network adapter 126 interconnects system bus 133 with an outside network 136 enabling processing system 20 to communicate with other such systems.

A display (e.g., a display monitor) 135 is connected to system bus 133 by display adaptor 132, which may include a graphics adapter to improve the performance of graphics intensive applications and a video controller. In one aspect of the present disclosure, adapters 126, 127, and/or 132 may be connected to one or more I/O busses that are connected to system bus 133 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 133 via user interface adapter 128 and display adapter 132. A keyboard 129, mouse 130, and speaker 131 may be interconnected to system bus 133 via user interface adapter 128, which may include, for example, a Super I/O chip integrating multiple device adapters into a single integrated circuit.

In some aspects of the present disclosure, processing system 20 includes a graphics processing unit 137. Graphics processing unit 137 is a specialized electronic circuit designed to manipulate and alter memory to accelerate the creation of images in a frame buffer intended for output to a display. In general, graphics processing unit 137 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 121, storage capability including system memory (e.g., RAM 124), and mass storage 134, input means such as keyboard 129 and mouse 130, and output capability including speaker 131 and display 135. In some aspects of the present disclosure, a portion of system memory (e.g., RAM 124) and mass storage 134 collectively store an operating system to coordinate the functions of the components shown in processing system 20.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

The present techniques provide for correcting for oil-based mud stand-off from oil-based mud resistivity images without the need to measure stand-offs between electrodes of the sensors and the wall of the borehole. Oil-based mud resistivity imaging tools can separately measure a real part and an imaginary part (magnitude and phase) of the impedance between the transmitting electrode and each receiving electrode (button) of the sensors of the tool 16. In ideal conditions, the oil-based mud is regarded as a perfect electrical insulator which only capacitively couples to high-frequency electromagnetic excitations, while the formation is simplified to a perfect electrical resistor. The equivalent circuit model for this simplified scenario is shown in FIG. 2A.

Figure 2A:
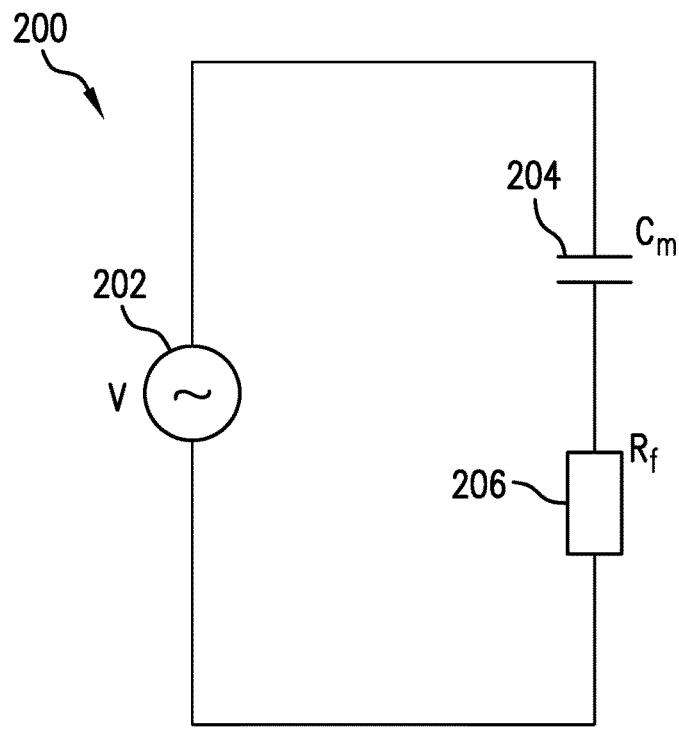
FIG. 2A depicts an equivalent circuit model when oil-based mud is regarded as a perfect electrical insulator according to one or more embodiments described herein.

In particular, FIG. 2A depicts an equivalent circuit model 200 when oil-based mud is regarded as a perfect electrical insulator. In this example, a voltage signal 202 is provided by the tool 16 and is transmitted to the formation 26. A mud capacitance $C_m$ 204 and a formation resistivity $R_f$ 206 influence the voltage signal 202. The real-part of measured impedance is only dependent on formation resistivity $R_f$ 206. The formation resistivity image derived from the real-part measured impedance (scaled with the tool constant) should be ideally stand-off independent, as the stand-off only affects the imaginary part of measured impedance.

Figure 2B:
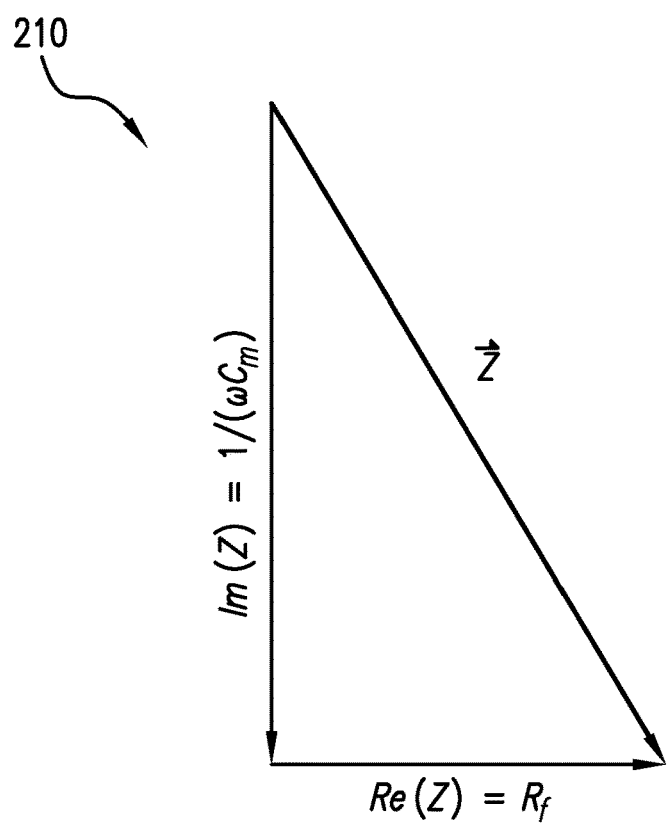
FIG. 2B depicts a model of a composition of the complex measured impedance of the idealized scenario of FIG. 2A according to one or more embodiments described herein.

FIG. 2B depicts a model 210 of a composition of the complex measured impedance of the idealized scenario of FIG. 2A. The example of FIG. 2B shows that the impedance $\vec{Z}$ is a function of Re(Z) and Im(Z) are the real and the imaginary components respectively of impedance measured by the tool 16 in the borehole drilled in the earth formation and filled with an oil-based drilling fluid.

In reality, oil-based mud does not act as a perfect insulator. In some cases, the electrical conductivity of typical oil-based mud is non-negligible, frequency dependent, and varies greatly depending on the oil/water ratio, downhole conditions, and chemical additives in the mud, for example. Meanwhile, the formation impedance is not entirely resistive. When the frequency is high and formation resistivity is high, the imaginary component in formation impedance due to formation dielectric permittivity becomes significant. In summary, both mud and formation impedances are complex values each having its own real and imaginary components. To compensate for the imperfect insulation of oil-based muds, it is desirable to account for mud stand-off by estimating the apparent dielectric loss of the mud.

Figure 3:
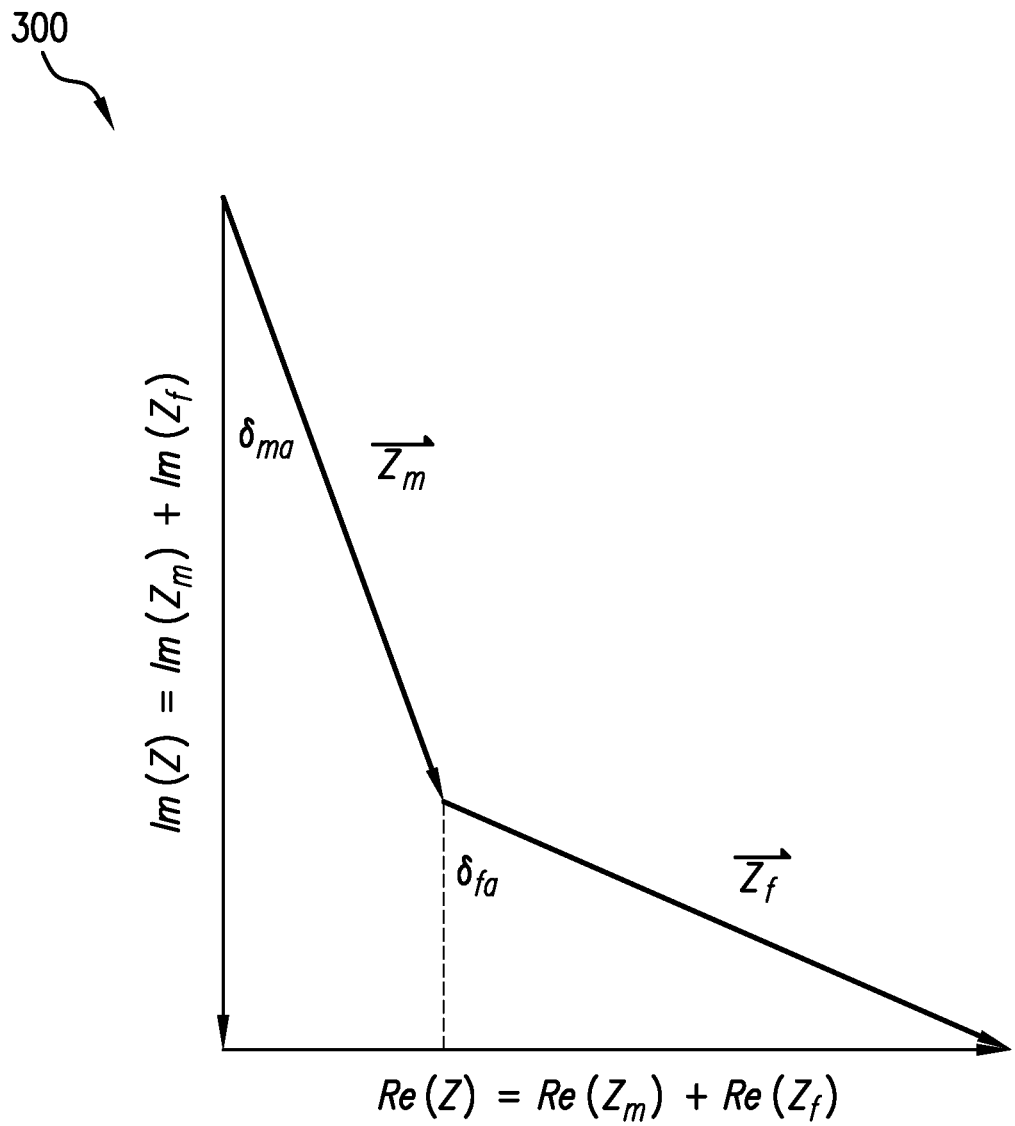
FIG. 3 depicts a model of a realistic scenario of mud impedance and formation impedance that can be used to estimate apparent dielectric loss of the mud according to one or more embodiments described herein.

FIG. 3 depicts a model 300 of a realistic scenario of mud impedance and formation impedance that can be used to estimate the apparent dielectric loss of the mud according to one or more embodiments described herein. In this example, $\vec{Z_m}$ is the complex impedance due to the mud stand-off and $\delta_{ma}$ is the apparent dielectric loss angle of the mud, $$\delta_{ma} = \tan^{-1}((Re(Z_m))/Im(Z_m)),$$

where $Re(Z_m)$ and $Im(Z_m)$ are the real and the imaginary components respectively of impedance measured by the tool 16 in homogeneous mud (with no formation present). Generally, $\delta_{ma}$ is similar to, but may differ from, the actual dielectric loss angle of the mud, expressed as $$\delta_m = \tan^{-1}\left(\frac{\sigma_m}{\omega \varepsilon'_m}\right),$$

where $\omega$ is angular frequency, $\sigma_m$ is electrical conductivity, $\varepsilon'_m$ and is dielectric permittivity of the mud. This difference (between the apparent dielectric loss angle of the mud $\delta_{ma}$ and the actual dielectric loss angle of the mud $\delta_m$) is caused by the inhomogeneous electromagnetic field distribution across the electrodes of the sensor(s) of the tool 16, the fringing effect, and/or other current return paths specific to the imaging tool design of the tool 16.

In an ideal situation where oil-based mud is nonconductive, the apparent dielectric loss angle of the mud $\delta_{ma}$ is approximately zero. Similar notation applies to formation impedance $\vec{Z_f}$ and the corresponding apparent formation dielectric loss angle $\delta_{fa}$. The measured real-part impedance is the addition of real components of both $\vec{Z_m}$ and $\vec{Z_f}$. If left untreated, the additional $Re(Z_m)$ in the final result not only leads to a general over-estimation of the formation resistivity but also causes the formation resistivity image to be stand-off dependent due to the fact that $\vec{Z_m}$ is inversely proportional to stand-off to first order approximation. Because sensor stand-off is generally unknown, its effect cannot be easily corrected through regular techniques that involve estimating the magnitude of $\vec{Z_m}$. Image quality is therefore negatively influenced.

The present techniques improve resistivity imaging by correcting for oil-based mud stand-off from oil-based mud resistivity images. In particular, the present techniques estimate the apparent mud dielectric loss angle, which can be determined using one (or more) of three different techniques: a logging with a closed pad technique, a logging in a cased-hole section technique, and a log-based estimation technique.

Figures 4A, 4B:
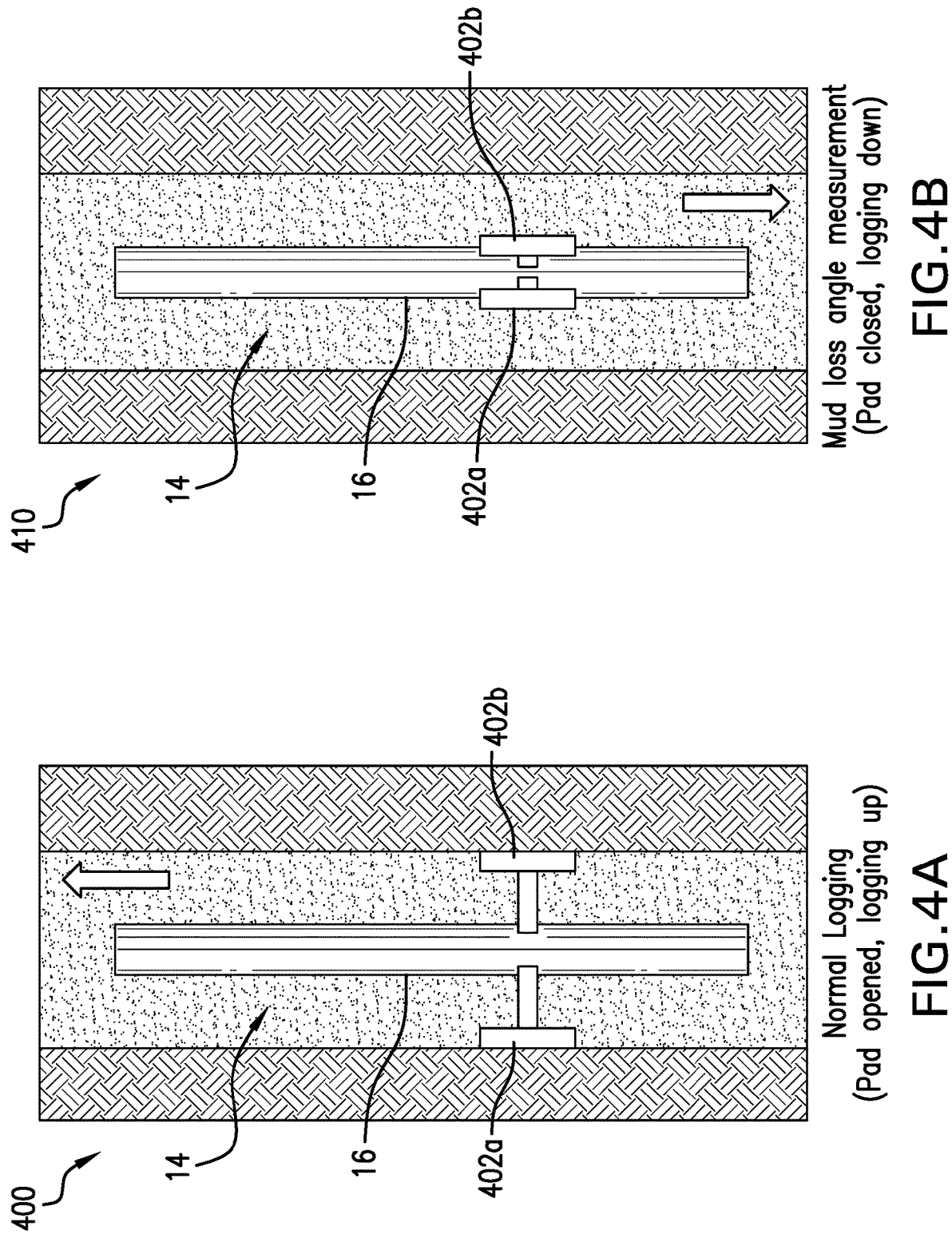
FIG. 4A depicts a normal logging operation for logging up in a borehole having a tool disposed therein, the tool having open pads according to one or more embodiments described herein.
FIG. 4B depicts a closed pad technique for mud loss angle measurement within a borehole according to one or more embodiments described herein.

The logging with a closed pad technique is now described and includes estimating the apparent dielectric loss angle $\delta_{ma}$ when performing a logging operation within a borehole while pads connected to the logging assembly are in a closed position and thus are disengaged from the borehole wall. A wireline resistivity borehole imaging device (e.g., the tool 16) typically has a central mandrel and multiple pads (with sensor electrodes) connected to the mandrel through metallic arms and linkages that can be commanded to open up to allow the pads contact the borehole wall while logging. FIG. 4A depicts a normal logging operation 400 for logging up in a borehole 14 having a tool 16 disposed therein, the tool 16 having pads 402a, 402b that are in an open position according to one or more embodiments described herein.

When the diameter of the borehole 14 is relatively large, measurement of mud loss angle could be achieved through logging while the pads 402a, 402b are in a closed position, as shown in FIG. 4B. In particular, FIG. 4B depicts logging with a closed pad technique 410 for mud loss angle measurement within the borehole 14 according to one or more embodiments described herein. This can be done either during lowering the tool into the borehole (logging-down as shown in FIG. 4B) or during the normal logging process (logging-up as shown in FIG. 4A). Measuring mud while logging-down provides optimization of rig time and does not interfere with the normal logging process.

Figure 5:
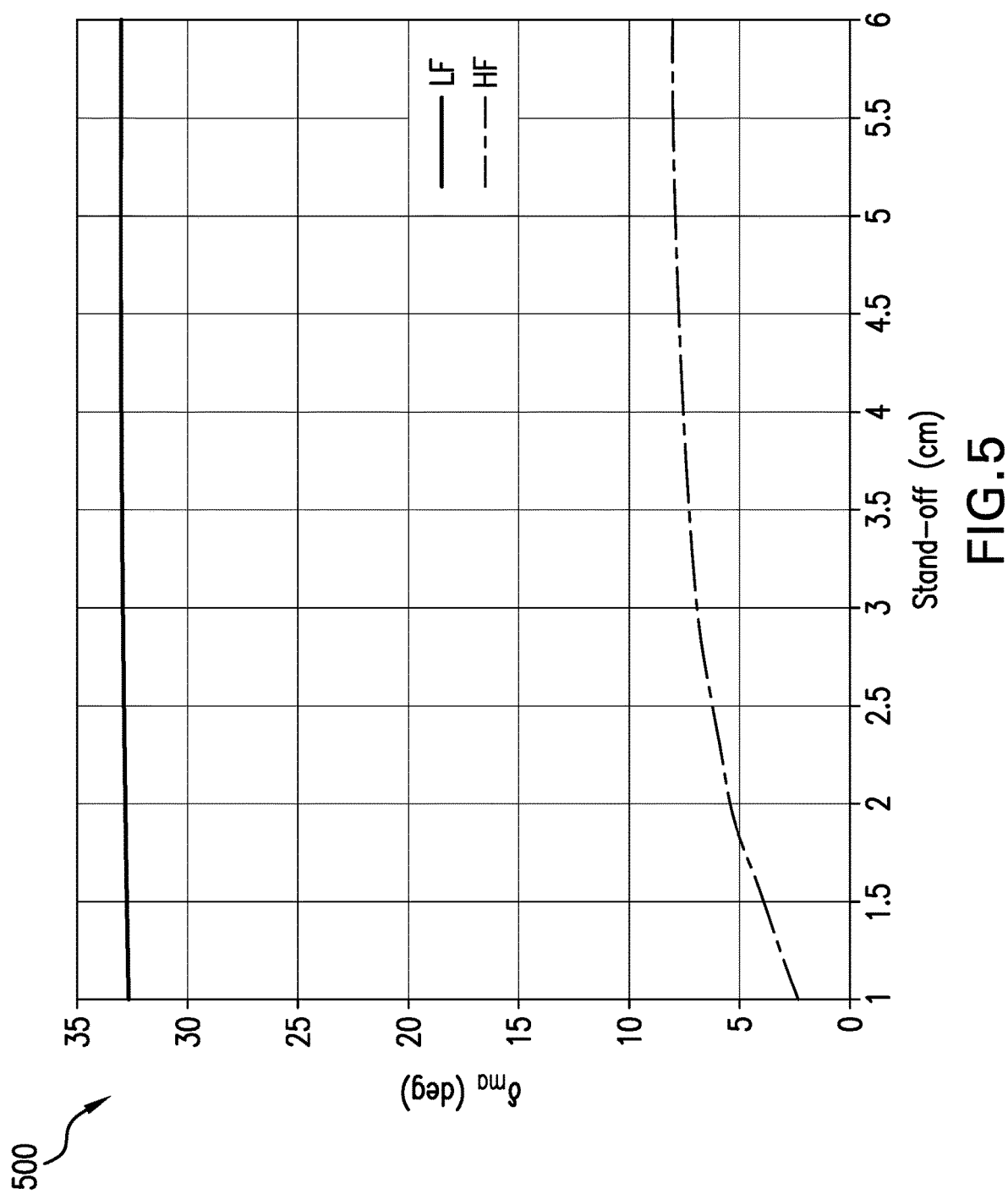
FIG. 5 depicts a graph of simulation results of the apparent dielectric loss angle of the mud as a function of the stand-off (distance between the pad surface and the borehole wall) for different operating frequencies according to one or more embodiments described herein.

The limitation of the logging with a closed pad technique is that the borehole has to be sufficiently large; otherwise, the formation affects the tool measurement even if the pad is in closed position. FIG. 5 depicts a graph 500 of simulation results of the apparent dielectric loss angle of the mud $\delta_{ma}$ as a function of the stand-off (distance between the pad surface and the borehole wall) for different operating frequencies according to one or more embodiments described herein. In this example, the mud resistivity is 1000 ohm and mud relative permittivity is 5. Formation resistivity is 0.1 ohm and formation relative permittivity is 40. LF and HF correspond to low-frequency and high-frequency measurements, respectively. FIG. 5 shows that as frequency increases, the dependency of mud loss angle on formation properties intensifies. For the high-frequency measurement (e.g., measurements above 10 MHz) the stand-off value may need to be at least five centimeters (around two inches) for the mud loss angle to become formation-independent. Assuming the outer diameter of the imaging tool (e.g., the tool 16) is 4.5 inches in pad-closed position (see FIG. 4B) and that the tool is centralized within the borehole 14, the inner diameter of the borehole 14 will need to be at least 8.5 inches in order to accurately estimate the apparent dielectric loss angle of the mud $\delta_{ma}$ using the logging with a closed pad technique. In some examples, if the tool 16 can be decentralized, this technique can be applicable to smaller boreholes using data collected on pads facing the axis of the borehole while the tool is in a decentralized position.

Figure 6:
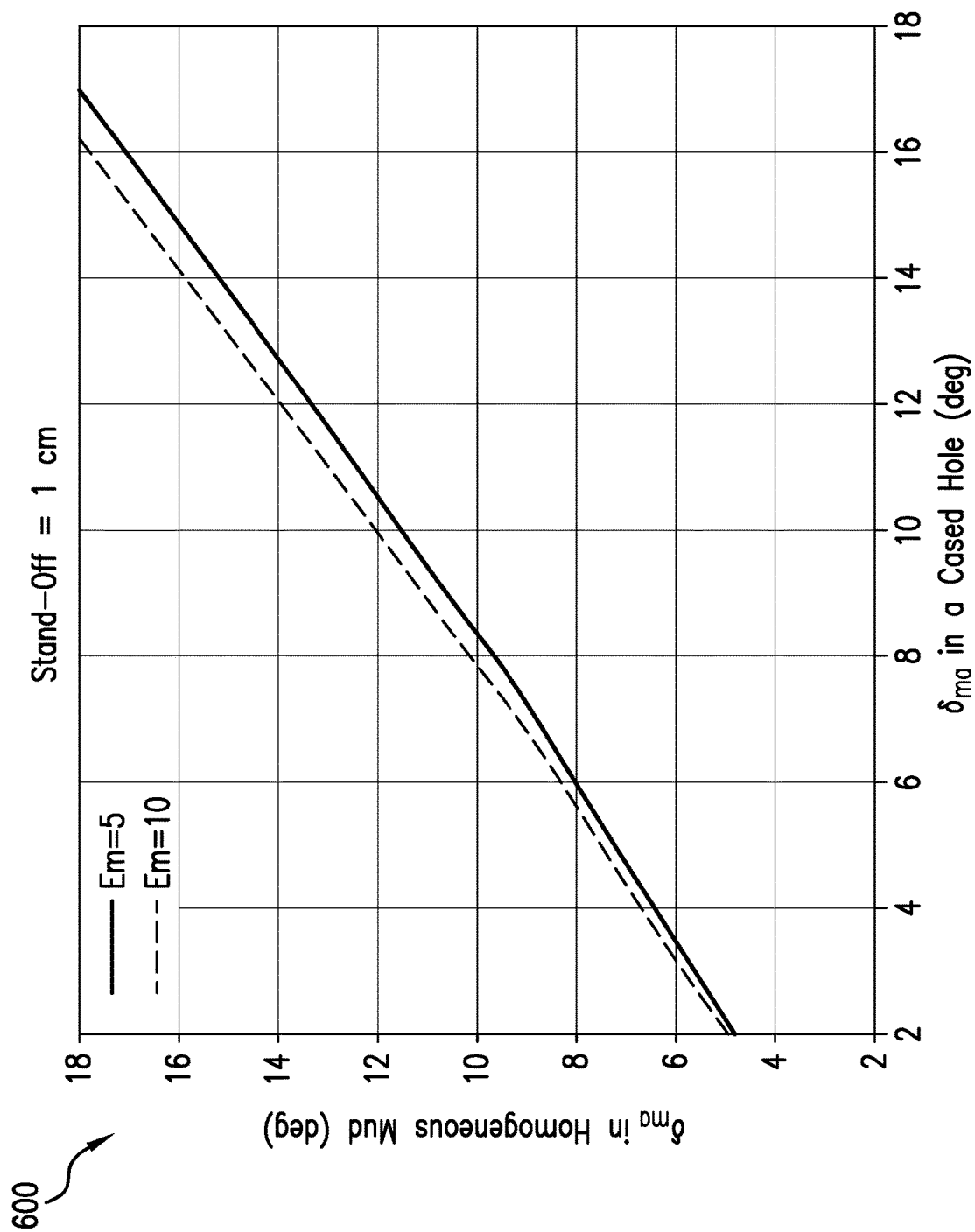
FIG. 6 depicts a graph of a cross-plot assuming a centralized tool with one centimeter stand-off from the inner casing surface of the borehole at a particular operating frequency according to one or more embodiments described herein.

The logging in a cased-hole section technique operates in smaller boreholes than the logging with a closed pad technique. In these smaller boreholes, measurements on mud properties are affected by formation properties that are generally unknown. In order to reduce the number of unknown formation properties, measurements can be obtained in a cased-hole section of the borehole 14 where the formation behind a highly conductive steel casing used to case the borehole is completely shielded by the casing and its influence on tool measurements is removed. If the casing inner diameter and the pad outer diameter are both known, forward modeling studies can be conducted and cross-plot charts can be created to estimate the apparent dielectric loss angle of the mud $\delta_{ma}$ in homogeneous mud from the apparent dielectric loss angle of the mud $\delta_{ma}$ inside the mud-filled casing. FIG. 6 depicts a graph 600 of a cross-plot assuming a centralized tool with one-centimeter stand-off from the inner casing surface of the borehole at a particular operating frequency according to one or more embodiments described herein. The graph 600 is depicted for a variety of mud conductivity and permittivity combinations and plots the apparent dielectric loss angle of the mud $\delta_{ma}$ in the mud-filled casing against the apparent dielectric loss angle of the mud $\delta_{ma}$ in homogeneous mud for electromagnetic values 5 and 10 respectively. It is also possible to continuously record measurements and the pad-casing distance while the pads are gradually opened in a cased hole. The measurements can then be compared against a series of cross-plots similar to FIG. 6 with different stand-off values to both determine the properties of the mud and calibrate the tool responses.

The log-based estimation technique can be useful to estimate the apparent dielectric loss angle of the mud $\delta_{ma}$ when the logging with a closed pad technique and the logging in a cased-hole technique are unavailable. The value for the apparent dielectric loss angle of the mud $\delta_{ma}$ may be estimated using a minimum apparent dielectric loss angle of the overall measured impedance through a sufficiently large depth interval of the image log L, expressed as follows $$\delta_{ma} \sim \min_L \left( \tan^{-1}\left(\frac{Re(Z_m)}{Im(Z_m)}\right) \right).$$

In this example, it is assumed that the formation has a greater dielectric loss than the oil-based mud; therefore, the apparent dielectric loss angle of the overall measured impedance tends to be greater than or equal to the apparent dielectric loss angle of the mud $\delta_{ma}$ depending on the stand-off. Effectively, this estimation uses the apparent dielectric loss angle of a measurement taken at the greatest stand-off value as the estimation of the apparent dielectric loss angle of the mud $\delta_{ma}$. The log-based estimation technique can also be used to verify the apparent dielectric loss angle of the mud $\delta_{ma}$ determined using the logging with a closed pad technique and/or the logging in a cased-hole technique. This can provide confidence in the estimated apparent dielectric loss angle of the mud $\delta_{ma}$.

Once the apparent dielectric loss angle of the mud $\delta_{ma}$ is estimated, the formation resistivity of the formation 26 can be determined by estimating the apparent formation dielectric loss angle $\delta_{fa}$. The apparent formation dielectric loss angle $\delta_{fa}$ can be estimated through the true formation dielectric loss angle as follows:

$$\delta_f = \tan^{-1}\left(\frac{\sigma_f}{\varepsilon'_f \omega}\right),$$

where $\sigma_f$ and $\varepsilon'_f$ are the conductivity and permittivity of the formation 26, respectively. The formation resistivity depends on whether $\delta_f$ is greater than a threshold value (e.g. 85 degrees) as described herein. It should be appreciated that the threshold can vary and can be greater than or less than the example of 85 degrees.

Estimation of the formation dielectric loss angle $\delta_f$ can be performed using the Complex Refractive Index Method (CRIM), which is a relation on complex dielectric permittivity of a formation given formation porosity, frequency, and complex dielectric permittivity of formation matrix and fluids. These parameters may be estimated based on prior knowledge or other logs acquired in the same well or locations with similar formation properties.

CRIM relates a complex permittivity of porous media to porosity $\varphi$ filled by water, complex permittivity of water $\dot{\varepsilon}_w$, and permittivity of matrix $\varepsilon_m$ as follows:

$$\dot{\varepsilon} = [\varphi \sqrt{\dot{\varepsilon}_w} + (1-\varphi)\sqrt{\varepsilon_m}]^2$$

In the above expression $\dot{\varepsilon}_w = \dot{\varepsilon} r_w \cdot \varepsilon 0$ and $\dot{\varepsilon}_m = \dot{\varepsilon} r_m \cdot \varepsilon 0$, where $\dot{\varepsilon} r_w$ represents a complex relative permittivity of water, $\varepsilon r_m$ represents a complex relative permittivity of the mud, and $\varepsilon 0 \approx 8.854$ pF/m, which represents an absolute dielectric permittivity of free space. The impedance $\dot{Z}$ (from FIG. 2B) is expressed as a function of formation parameters and a geometric tool factor G as follows:

$$\dot{Z} = G \cdot \frac{1}{j \cdot \omega \cdot \dot{\varepsilon}}$$

In this case, the loss angle in terms of impedance is 90 degrees.

The complex permittivity of water $\dot{\varepsilon}_w$ is a function of salinity, temperature, and frequency. The Meissner model can be used to estimate the range of temperature and salinity existing in oil wells according to one or more embodiments described herein. In the range of porosity, water salinity, temperature, frequency, and permittivity of matrix $\varepsilon_m$, loss angles below 85 degrees are possible when simultaneously the temperature is below 140 degrees Fahrenheit, salinity below 5 parts per thousand, and a frequency equal or above of 44 MHz or the porosity is much smaller than 1%, according to one or more embodiments described herein. Varying the porosity while maintaining fixed the rest of parameters, the loss angle remains constant.

The formation resistivity of the formation 26 depends on the value of the formation dielectric loss angle $\delta_f$ compared to a threshold. For example, If the formation dielectric loss angle $\delta_f$ is greater than a threshold value (e.g. 85 degrees), the formation resistance is:

$$Re(Z_f) \sim Re(Z) - Im(Z)^* \tan(\delta_{ma}).$$

However, if the formation dielectric loss angle $\delta_f$ is not greater than the threshold value (e.g. 85 degrees), the formation resistance is:

$$Re(Z_f) \sim Re(Z).$$

Figure 7:
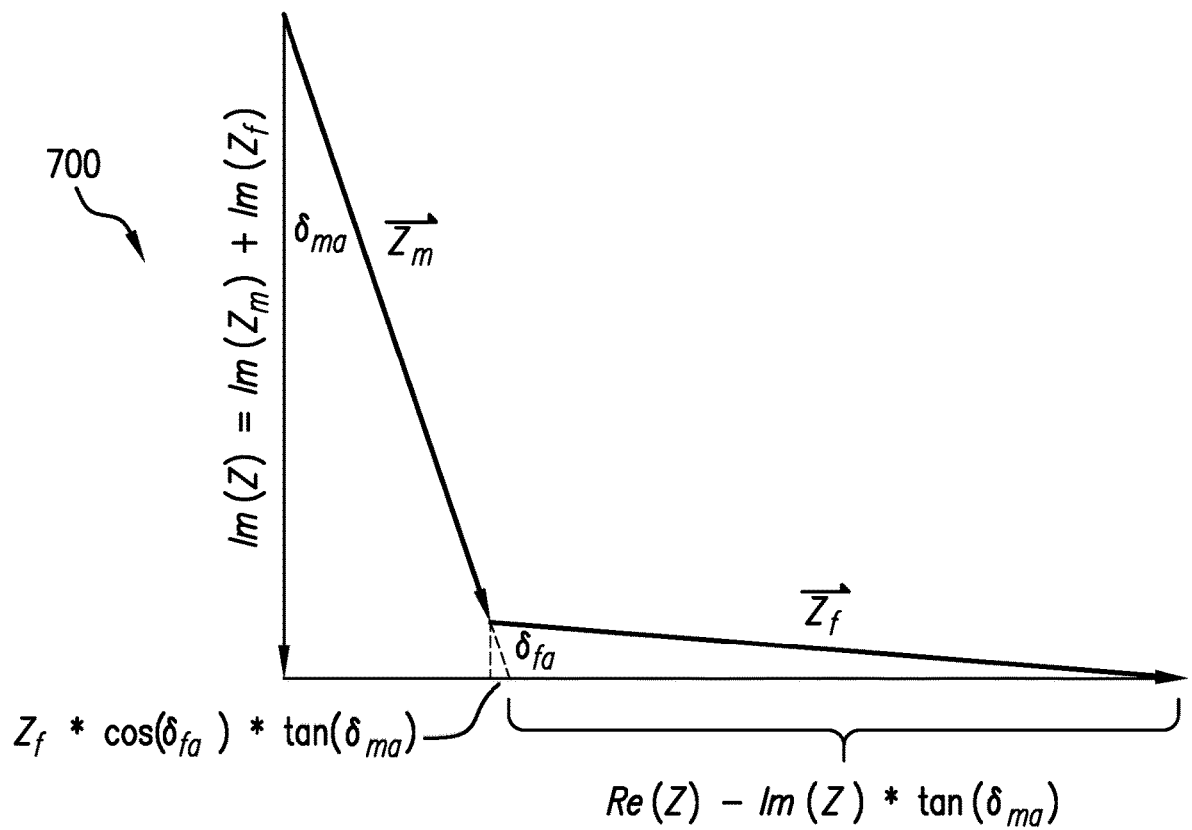
FIG. 7 depicts a model of a negligible formation dielectric effect according to one or more embodiments described herein.
Figure 8:
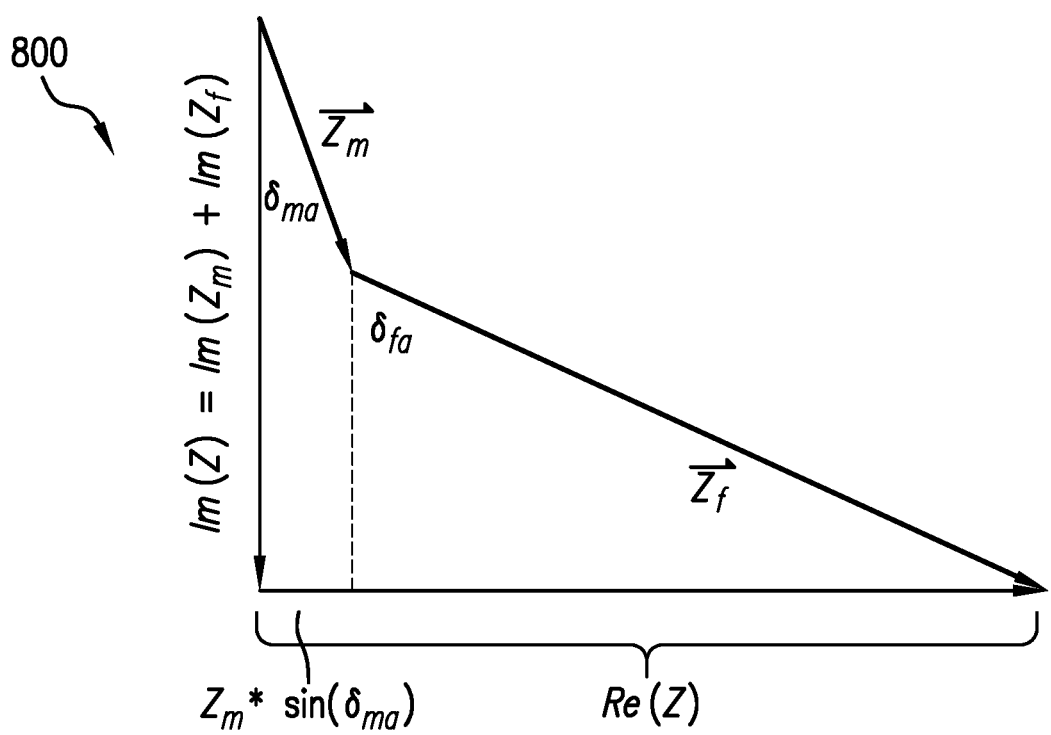
FIG. 8 depicts a model of a non-negligent formation dielectric effect according to one or more embodiments described herein.

FIG. 7 depicts a model 700 of a negligible formation dielectric effect according to one or more embodiments described herein, and FIG. 8 depicts a model 800 of a non-negligent formation dielectric effect according to one or more embodiments described herein.

In some examples, if an estimation of the formation dielectric loss angle $\delta_f$ is not possible, both mathematical approximations can be applied on an entire log interval to generate two resistivity images. Either user-guided or computer-based selections can then be conducted on an interval-by-interval basis to produce a final resistivity image that represents the formation properties through a combination of the two resistivity images.

If formation conductivity is sufficiently high and frequency sufficiently low, the formation dielectric loss angle $\delta_f$ is considered greater than a threshold (e.g., 85 degrees). In such cases, the dielectric effect of formation is generally negligible (see FIG. 7), and the formation dielectric loss angle $\delta_f$ will be between, for example, 85 and 90 degrees. Accordingly, a complex measured impedance diagram can be approximated by the expression $$Re(Z_f) \sim Re(Z) - Im(Z)^* \tan(\delta_{ma}).$$

It is apparent from FIG. 7 that the approximation underestimates the formation resistance by the amount $$Z_f^* \cos(\delta_{fa})^* \tan(\delta_{ma}).$$

However, since the formation dielectric loss angle $\delta_f$ is close to 90 degrees, this term is negligible.

In contrast, when formation resistivity is high and/or frequency is high, the formation dielectric effect is no longer negligible (see FIG. 8), as the formation dielectric loss angle $\delta_f$ will be (possibly significantly) less than the threshold (e.g., 85 degrees). Meanwhile, in this situation formation resistance $Z_f$ is usually high enough to dominate $Z_m$. Under such condition, the formation resistance can be estimated using the following expression:

$$Re(Z_f) \sim Re(Z).$$

FIG. 8 illustrates that the approximation overestimates the formation resistance by the amount $$Z_m * \sin(\delta_{ma}).$$

However, since $Z_m$ is small compared to $Z_f$ this error term is negligible.

The present techniques provide advantages over existing techniques by estimating apparent dielectric loss angle of oil-based mud to determine a stand-off effect caused by the oil-based mud and further estimate a formation dielectric loss angle. From these two estimations, a formation resistance can be determined and used to adjust a formation evaluation. In other words, formation evaluations are improved by accounting for the stand-off effect caused by the oil-based mud. Wellbore operations can be more accurately performed as a result of improved formation evaluations accounting for the stand-off effect caused by the oil-based mud.

Figure 9:
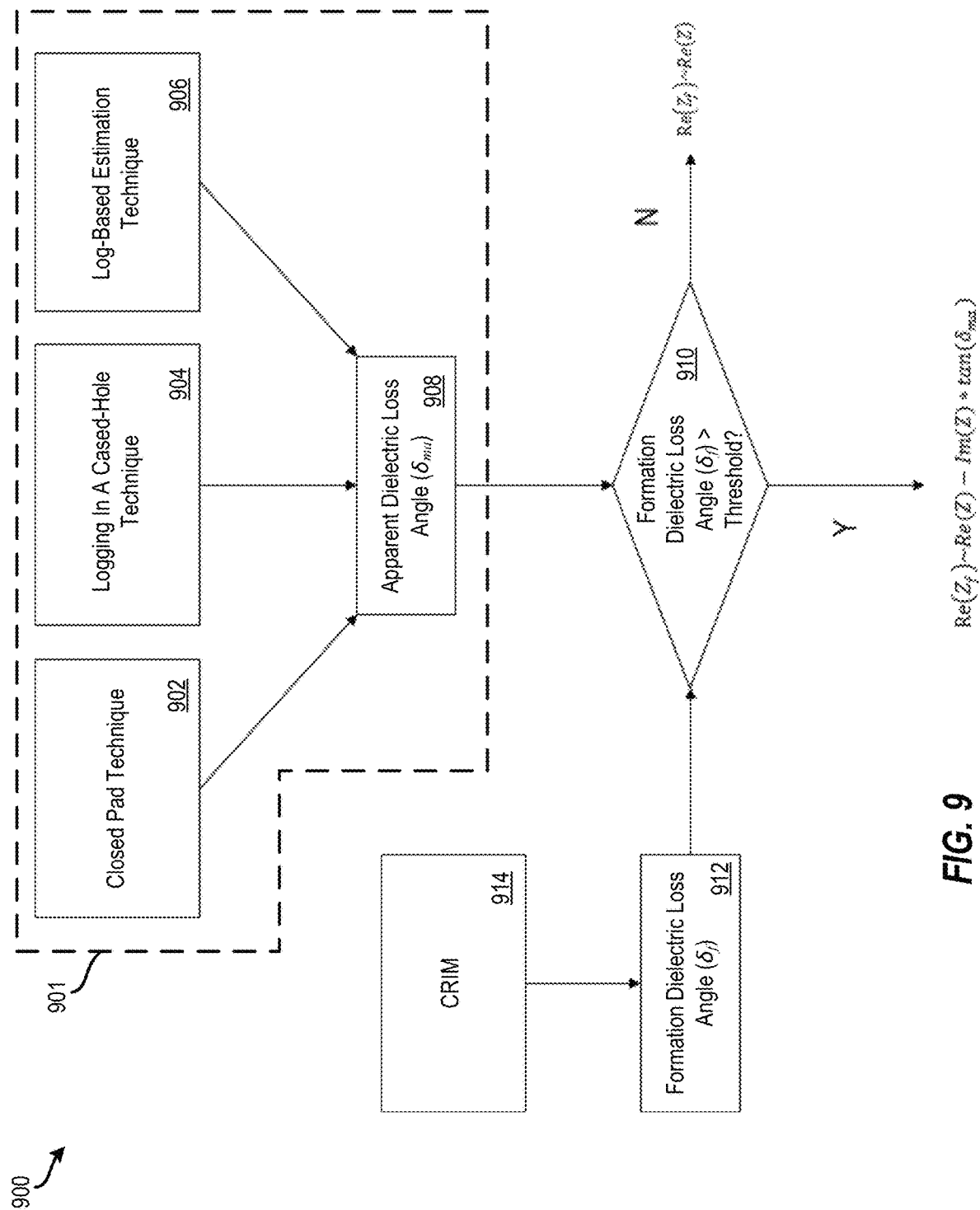
FIG. 9 depicts a flow diagram of a method for correcting oil-based mud resistivity images for mud stand-off effect according to one or more embodiments described herein.

FIG. 9 depicts a flow diagram of a method 900 for correcting oil-based mud resistivity images for mud stand-off effect according to one or more embodiments described herein. The method 900 can be implemented by a suitable processing device and/or processing system, such as the processing system 20 of FIGS. 1A and 1B and/or the processing system 1000 of FIG. 10.

At block 901, the method 900 includes estimating an apparent dielectric loss angle $\delta_{ma}$ of the oil-based mud (block 908) to determine a stand-off effect caused by the oil-based mud using at least one of a logging with a closed pad technique (block 902), a logging in a cased-hole section technique (block 904), and a log-based estimation technique (block 906). At block 912, a formation dielectric loss angle $\delta_f$ is determined using, for example, CRIM (block 914).

At decision block 910, the formation dielectric loss angle $\delta_f$ is compared to a threshold (e.g., 85 degrees). If the formation dielectric loss angle $\delta_f$ is greater than the threshold, the formation resistance is determined to be $$Re(Z_f) \sim Re(Z) - Im(Z) * \tan(\delta_{ma}),$$

where $Re(Z)$ and $Im(Z)$ are a real component and an imaginary component respectively of an impedance measured by the logging assembly in a borehole filled with oil-based mud in an earth formation, and $\delta_{ma}$ is the apparent dielectric loss angle of the oil-based mud. However, if the formation dielectric loss angle $\delta_f$ is not greater than the threshold, the formation resistance is determined to be $$Re(Z_f) \sim Re(Z),$$

where $Re(Z)$ is a real component of an impedance measured by the logging assembly in a borehole filled with oil-based mud in an earth formation.

Additional processes also may be included, and it should be understood that the process depicted in FIG. 9 represents an illustration, and that other processes may be added or existing processes may be removed, modified, or rearranged without departing from the scope and spirit of the present disclosure.

Figure 10:
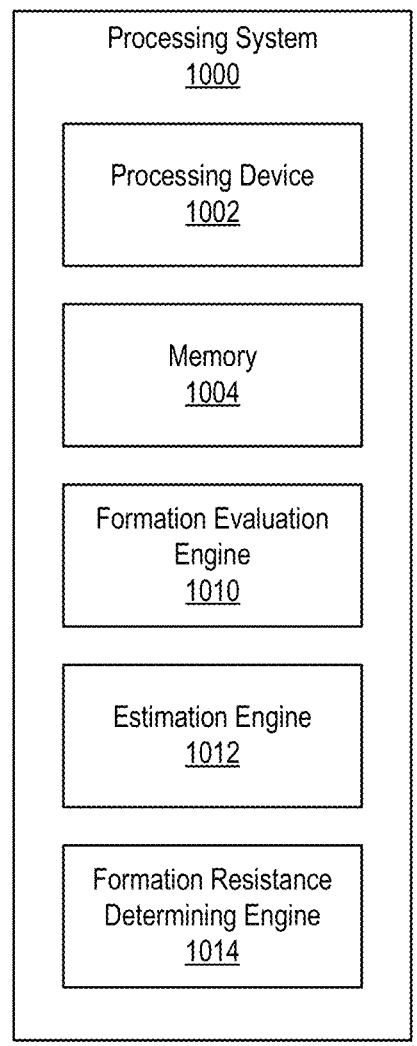
FIG. 10 depicts a block diagram of a processing system for correcting oil-based mud resistivity images for mud stand-off effect according to one or more embodiments described herein.

FIG. 10 depicts a block diagram of a processing system 1000 for correcting oil-based mud resistivity images for mud stand-off effect according to one or more embodiments described herein. The processing system 1000 includes a processing device 1002, a memory 104, a formation evaluation engine 1010, an estimation engine 1012, and a formation resistance determining engine 1014.

The components, modules, engines, etc. described regarding FIG. 10 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 1002 for executing those instructions. Thus a system memory (e.g., the memory 1004) can store program instructions that when executed by the processing device 1002 implement the engines described herein. Other engines can also be utilized to include other features and functionality described in other examples herein.

Figure 11:
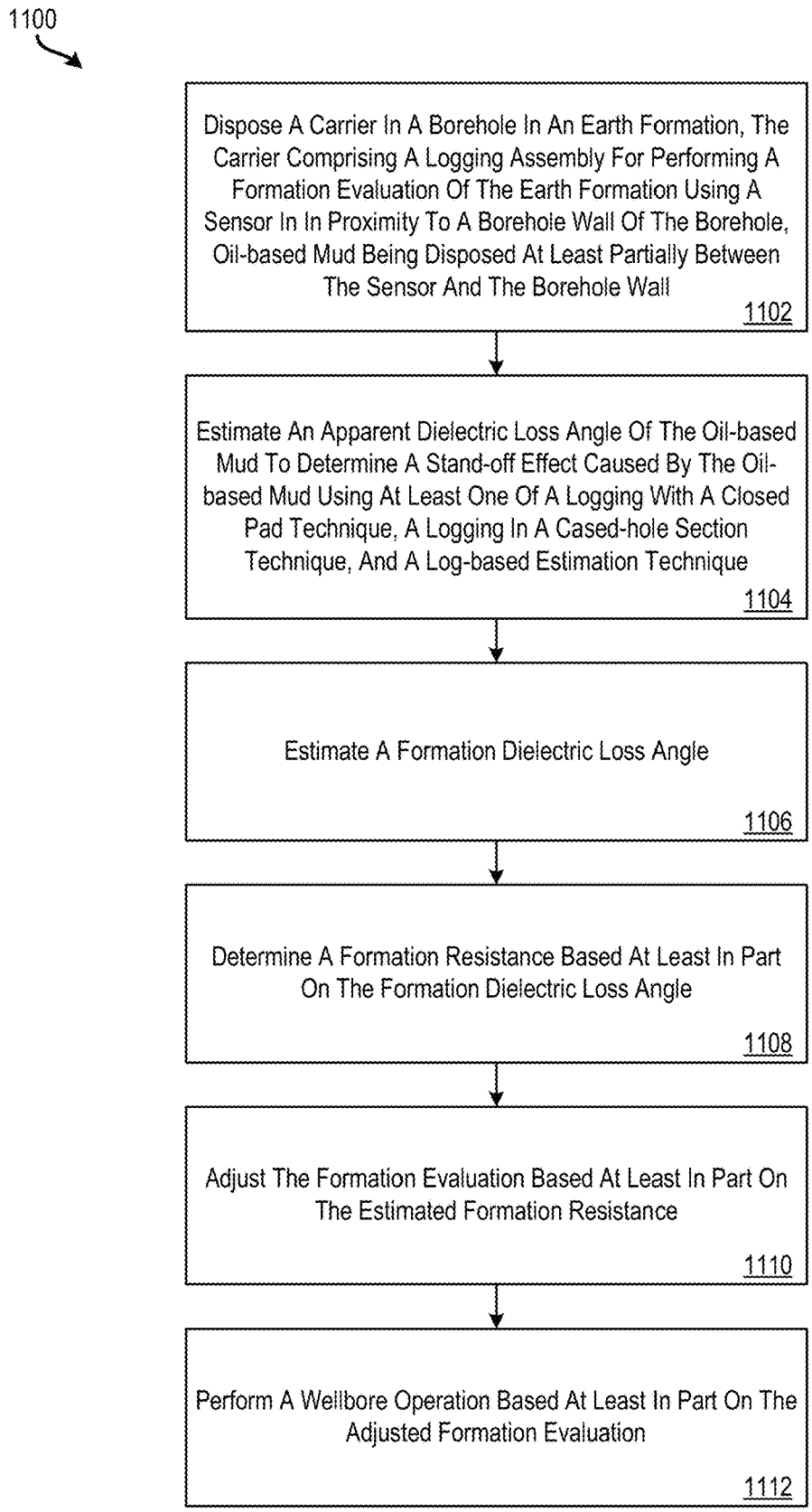
FIG. 11 depicts a flow diagram of a method for correcting oil-based mud resistivity images for mud stand-off effect according to one or more embodiments described herein.

The functionality of the processing system 1000 and its components are not described with reference to FIG. 11. In particular, FIG. 11 depicts a flow diagram of a method 1100 for correcting oil-based mud resistivity images for mud stand-off effect according to one or more embodiments described herein. The method 1100 can be implemented by a suitable processing device and/or processing system, such as the processing system 20 of FIGS. 1A and 1B and/or the processing system 1000 of FIG. 10.

At block 1102, a carrier (e.g., the borehole string 12) is disposed in a borehole (e.g., the borehole 14) in an earth formation (e.g., the formation 26). The carrier includes a logging assembly (e.g., the tool 16) for performing a formation evaluation, using the formation evaluation engine 1010, of the earth formation using a sensor in proximity to a borehole wall of the borehole. Oil-based mud is disposed at least partially between the sensor and the borehole wall.

At block 1104, the estimation engine 1012 estimates an apparent dielectric loss angle $\delta_{ma}$ of the oil-based mud to determine a stand-off effect caused by the oil-based mud. The apparent dielectric loss angle $\delta_{ma}$ is determined using at least one of a logging with a closed pad technique, a logging in a cased-hole section technique, and a log-based estimation technique. The logging with a closed pad technique includes estimating the apparent dielectric loss angle when performing a logging operation within the borehole while a pad connected to the logging assembly is in a closed position. The logging in a cased-hole section technique includes estimating an apparent dielectric loss angle in homogeneous mud from an apparent dielectric loss angle of oil-based mud inside a mud-filled casing of the borehole. The log-based estimation technique includes estimating the apparent dielectric loss angle of the oil-based mud based at least in part on a minimum apparent dielectric loss angle of an overall measured impedance through a depth interval of an image log.

At block 1106, the estimation engine 1012 estimates a formation dielectric loss angle $\delta_f$. Such estimation can be performed using the complex refractive index model (CRIM). At block 1108, the formation resistance determining engine 1014 determines a formation resistance based at least in part on the formation dielectric loss angle.

At block 1110, the formation evaluation engine 1010 adjusts the formation based on the estimated formation resistance. This can include comparing the formation dielectric loss angle to a threshold (e.g., 85 degrees). When the formation dielectric loss angle is greater than the threshold, the formation resistance $Re(Z_f)$ is $$Re(Z_f) \sim Re(Z) - Im(Z)*\tan(\delta_{ma}),$$

where $Re(Z)$ and $Im(Z)$ are a real component and an imaginary component respectively of an impedance measured by the logging assembly in a borehole filled with oil-based mud in an earth formation, and $\delta_{ma}$ is the apparent dielectric loss angle of the oil-based mud. However, when the formation dielectric loss angle is greater than the threshold, the formation resistance $Re(Z_f)$ is $$Re(Z_f) \sim Re(Z),$$

where $Re(Z)$ is a real component of an impedance measured by the logging assembly in a borehole filled with oil-based mud in an earth formation.

At block 1112, a wellbore operation can be performed based on the adjusted formation evaluation. This can include, for example, controlling a drill string by changing a property of the drill string to cause the drill to change trajectory with respect to the earth formation. Controlling the drill string can also include changing a weight on bit of a drill bit of the drill string, changing a rate of penetration of the drill bit, and the like.

Additional processes also may be included, and it should be understood that the process depicted in FIG. 11 represents an illustration, and that other processes may be added or existing processes may be removed, modified, or rearranged without departing from the scope and spirit of the present disclosure.

Set forth below are some embodiments of the foregoing disclosure:

Embodiment 1

A method is provided, the method including: disposing a carrier in a borehole in an earth formation, the carrier comprising a logging assembly for performing a formation evaluation of the earth formation using a sensor in proximity to a borehole wall of the borehole, fluid being disposed at least partially between the sensor and the borehole wall; estimating, by a processing device, an apparent dielectric loss angle of the fluid to determine a stand-off effect caused by the fluid using at least one of a logging with a closed pad technique, a logging in a cased-hole section technique, and a log-based estimation technique; estimating, by the processing device, a formation dielectric loss angle; determining, by the processing device, a formation resistance based at least in part on the formation dielectric loss angle; adjusting the formation evaluation based at least in part on the estimated formation resistance that accounts for the stand-off effect caused by the fluid; and performing a wellbore operation based at least in part on the adjusted formation evaluation that accounts for the stand-off effect caused by the fluid.

Embodiment 2

The method of any prior embodiment, wherein the logging with a closed pad technique comprises estimating the apparent dielectric loss angle when performing a logging operation within the borehole while a pad connected to the logging assembly is in a closed position.

Embodiment 3

The method of any prior embodiment, wherein the logging in a cased-hole section technique comprises estimating an apparent dielectric loss angle in a homogeneous fluid from an apparent dielectric loss angle of fluid inside a fluid-filled casing of the borehole.

Embodiment 4

The method of any prior embodiment, wherein the log-based estimation technique comprises estimating the apparent dielectric loss angle of the fluid based at least in part on a minimum apparent dielectric loss angle of an overall measured impedance through a depth interval of an image log.

Embodiment 5

The method of any prior embodiment, wherein determining the formation resistance comprises comparing the formation dielectric loss angle to a threshold.

Embodiment 6

The method of any prior embodiment, wherein when the formation dielectric loss angle is greater than the threshold, the formation resistance is $$Re(Z_f) \sim Re(Z) - Im(Z)*\tan(\delta_{ma}),$$

where $Re(Z)$ and $Im(Z)$ are a real component and an imaginary component respectively of an impedance measured by the logging assembly in the borehole in the earth formation and being filled with an oil-based drilling fluid, and $\delta_{ma}$ is the apparent dielectric loss angle of the fluid.

Embodiment 7

The method of any prior embodiment, wherein when the formation dielectric loss angle is less than the threshold, the formation resistance is $$Re(Z_f) \sim Re(Z),$$

where $Re(Z)$ is a real component of an impedance measured by the logging assembly in the borehole in the earth formation and being filled with an oil-based drilling fluid.

Embodiment 8

The method of any prior embodiment, wherein the apparent dielectric loss angle of the fluid is defined as:

$$\delta_{ma} = \tan^{-1}\left(\frac{Re(Z_m)}{Im(Z_m)}\right)$$

where $\delta_{ma}$ is the apparent dielectric loss angle of the fluid, $Re(Z_m)$ and $Im(Z_m)$ are a real component and an imaginary component respectively of impedance measured by the logging assembly in a homogeneous borehole fluid.

Embodiment 9

The method of any prior embodiment, wherein the formation dielectric loss angle is determined using a complex refractive index model.

Embodiment 10

A system is provided, the system including a carrier disposed in a borehole in an earth formation, the carrier comprising a logging assembly for performing a formation evaluation of the earth formation using a sensor in proximity to a borehole wall of the borehole, fluid being disposed at least partially between the sensor and the borehole wall; a memory comprising computer readable instructions; and a processing device for executing the computer readable instructions for performing a method including: estimating, by the processing device, an apparent dielectric loss angle of the fluid to determine a stand-off effect caused by the fluid using at least one of a logging with a closed pad technique, a logging in a cased-hole section technique, and a log-based estimation technique; estimating, by the processing device, a formation dielectric loss angle; determining, by the processing device, a formation resistance based at least in part on the formation dielectric loss angle; adjusting the formation evaluation based at least in part on the estimated formation resistance that accounts for the stand-off effect caused by the fluid; and performing a wellbore operation based at least in part on the adjusted formation evaluation that accounts for the stand-off effect caused by the fluid.

Embodiment 11

The system of any prior embodiment, wherein the logging with a closed pad technique comprises estimating the apparent dielectric loss angle when performing a logging operation within the borehole while a pad connected to the logging assembly is in a closed position.

Embodiment 12

The system of any prior embodiment, wherein the logging in a cased-hole section technique comprises estimating an apparent dielectric loss angle in a homogeneous fluid from an apparent dielectric loss angle of fluid inside a fluid-filled casing of the borehole.

Embodiment 13

The system of any prior embodiment, wherein the log-based estimation technique comprises estimating the apparent dielectric loss angle of the fluid based at least in part on a minimum apparent dielectric loss angle of an overall measured impedance through a depth interval of an image log.

Embodiment 14

The system of any prior embodiment, wherein when the formation dielectric loss angle is greater than a threshold, the formation resistance is $Re(Z_f) \sim Re(Z) - Im(Z) * \tan(\delta_{ma})$, where $Re(Z)$ and $Im(Z)$ are a real component and an imaginary component respectively of an impedance measured by the logging assembly in the borehole in the earth formation and being filled with an oil-based drilling fluid, and $\delta_{ma}$ is the apparent dielectric loss angle of the fluid.

Embodiment 15

The system of any prior embodiment, wherein when the formation dielectric loss angle is less than a threshold, the formation resistance is $Re(Z_f) \sim Re(Z)$, where $Re(Z)$ is a real component of an impedance measured by the logging assembly in the borehole in the earth formation and being filled with an oil-based drilling fluid.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "coupled" relates to a first component being coupled to a second component either directly or indirectly via an intermediary component. The term "configured" relates to one or more structural limitations of a device that are required for the device to perform the function or operation for which the device is configured.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While one or more embodiments have been shown and described, modifications and substitutions may be made thereto without departing from the spirit and scope of the invention. Accordingly, it is to be understood that the present invention has been described by way of illustrations and not limitation.

It will be recognized that the components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method comprising:
disposing a carrier in a borehole in an earth formation, the carrier comprising a logging assembly for performing a formation evaluation of the earth formation using a sensor in proximity to a borehole wall of the borehole, fluid being disposed at least partially between the sensor and the borehole wall;
estimating, by a processing device, an apparent dielectric loss angle of the fluid to determine a stand-off effect caused by the fluid using at least one of a logging with a closed pad technique, a logging in a cased-hole section technique, and a log-based estimation technique;
estimating, by the processing device, a formation dielectric loss angle;
determining, by the processing device, a formation resistance based at least in part on the formation dielectric loss angle;

adjusting the formation evaluation based at least in part on the formation resistance that accounts for the stand-off effect caused by the fluid; and performing a wellbore operation based at least in part on the adjusted formation evaluation that accounts for the stand-off effect caused by the fluid, wherein determining the formation resistance comprises comparing the formation dielectric loss angle to a threshold, and wherein when the formation dielectric loss angle is greater than the threshold, the formation resistance is $Re(Z_f) \sim Re(Z) - Im(Z) * \tan(\delta_{ma})$, where $Re(Z)$ and $Im(Z)$ are a real component and an imaginary component respectively of an impedance measured by the logging assembly in the borehole in the earth formation and being filled with an oil-based drilling fluid, and $\delta_{ma}$ is the apparent dielectric loss angle of the fluid.

2. The method of claim 1, wherein the logging with a closed pad technique comprises estimating the apparent dielectric loss angle when performing a logging operation within the borehole while a pad connected to the logging assembly is in a closed position.

3. The method of claim 1, wherein the logging in a cased-hole section technique comprises estimating an apparent dielectric loss angle in a homogeneous fluid from an apparent dielectric loss angle of fluid inside a fluid-filled casing of the borehole.

4. The method of claim 1, wherein the log-based estimation technique comprises estimating the apparent dielectric loss angle of the fluid based at least in part on a minimum apparent dielectric loss angle of an overall measured impedance through a depth interval of an image log.

5. The method of claim 1, wherein when the formation dielectric loss angle is less than the threshold, the formation resistance is $Re(Z_f) \sim Re(Z)$, where $Re(Z)$ is a real component of an impedance measured by the logging assembly in the borehole in the earth formation and being filled with an oil-based drilling fluid.

6. The method of claim 1, wherein the apparent dielectric loss angle of the fluid is defined as $$\delta_{ma} = \tan^{-1}\left(\frac{Re(Z_m)}{Im(Z_m)}\right)$$

where $\delta_{ma}$ is the apparent dielectric loss angle of the fluid, $Re(Z_m)$ and $Im(Z_m)$ are a real component and an imaginary component respectively of impedance measured by the logging assembly in a homogeneous borehole fluid.

7. The method of claim 1, wherein the formation dielectric loss angle is determined using a complex refractive index model.

8. A system comprising:

a carrier disposed in a borehole in an earth formation, the carrier comprising a logging assembly for performing a formation evaluation of the earth formation using a sensor in proximity to a borehole wall of the borehole, fluid being disposed at least partially between the sensor and the borehole wall;

a memory comprising computer readable instructions; and a processing device for executing the computer readable instructions for performing a method comprising:

estimating, by the processing device, an apparent dielectric loss angle of the fluid to determine a stand-off effect caused by the fluid using at least one of a logging with a closed pad technique, a logging in a cased-hole section technique, and a log-based estimation technique;

estimating, by the processing device, a formation dielectric loss angle;

determining, by the processing device, a formation resistance based at least in part on the formation dielectric loss angle;

adjusting the formation evaluation based at least in part on the estimated formation resistance that accounts for the stand-off effect caused by the fluid; and performing a wellbore operation based at least in part on the adjusted formation evaluation that accounts for the stand-off effect caused by the fluid wherein when the formation dielectric loss angle is greater than a threshold, the formation resistance is $Re(Z_f) \sim Re(Z) - Im(Z) * \tan(\delta_{ma})$, where $Re(Z)$ and $Im(Z)$ are a real component and an imaginary component respectively of an impedance measured by the logging assembly in the borehole in the earth formation and being filled with an oil-based drilling fluid, and $\delta_{ma}$ is the apparent dielectric loss angle of the fluid.

9. The system of claim 8, wherein the logging with a closed pad technique comprises estimating the apparent dielectric loss angle when performing a logging operation within the borehole while a pad connected to the logging assembly is in a closed position.

10. The system of claim 8, wherein the logging in a cased-hole section technique comprises estimating an apparent dielectric loss angle in a homogeneous fluid from an apparent dielectric loss angle of fluid inside a fluid-filled casing of the borehole.

11. The system of claim 8, wherein the log-based estimation technique comprises estimating the apparent dielectric loss angle of the fluid based at least in part on a minimum apparent dielectric loss angle of an overall measured impedance through a depth interval of an image log.

12. The system of claim 8, wherein when the formation dielectric loss angle is less than a threshold, the formation resistance is $Re(Z_f) \sim Re(Z)$, where $Re(Z)$ is a real component of an impedance measured by the logging assembly in the borehole in the earth formation and being filled with an oil-based drilling fluid.

* * * * *